United States Patent Office 2,744,929
Patented May 8, 1956

2,744,929

PRODUCTION OF UNSATURATED CARBOXYLIC ACIDS

Curtis W. Smith and Roy T. Holm, Berkeley, Calif., assignors to Shell Development Company, Emeryville, Calif., a corporation of Delaware No Drawing. Application September 26, 1952,
Serial No. 311,802

19 Claims. (Cl. 260—530)

This invention relates to the oxidation of unsaturated aldehydes. It deals with a new method of carrying out such oxidation selectively to produce the corresponding unsaturated carboxylic acids in high yields.

The oxidation of saturated aldehydes to the corresponding saturated carboxylic acids is a well known reaction which is carried out commercially on a large scale, especially for the production of acetic acid. No such success has been achieved heretofore, however, in the oxidation of unsaturated aldehydes. Due to their great tendency to undergo side reactions during oxidation, unsaturated aldehydes give only poor yields of desirable acids under the usual conditions of reaction. Some unsaturated acid can be obtained by oxidizing unsaturated aldehydes with hydrogen peroxide according to Staudinger patent—U. S. 2,377,584 but large amounts of dihydroxy aldehyde are simultaneously produced in the patented process. As a result, expensive indirect methods of production have been generally necessary for the synthesis of unsaturated carboxylic acids.

It is an object of the present invention to overcome the foregoing disadvantages of prior methods of producing unsaturated carboxylic acids from aldehydes. An important object is to provide an efficient, commercially attractive method for converting unsaturated aldehydes to the corresponding unsaturated carboxylic acids by reaction with peroxides with reduced production of by-products. A special object of the invention is to produce high yields of alpha,beta-olefinic carboxylic acids by reacting alpha,beta-olefinic aldehydes with hydrogen peroxide. Another special object is to provide an advantageous method for recovery of the catalyst used in oxidizing aldehydes. Still another object of the invention is the provision of a method of oxidizing unsaturated aldehydes in which the product is recovered in the form of an ester of the corresponding acid. Further objects and advantages of the new method will be apparent from the following description of the invention.

It has been found that unsaturated aldehydes can be selectively oxidized at the aldehyde group to produce high yields of unsaturated carboxylic acids, by carrying out the reaction, in the presence of selenium or tellurium dioxide, with an oxidizing agent having an oxidation potential greater than that of said dioxide, preferably a peroxide oxidizing agent. This is quite surprising since not only do such oxidizing agents, particularly peroxides, tend to attack unsaturated linkages leading to polymerization or oxidation but also these dioxides are known to oxidize carbonylic compounds at other points in the molecule in preference to the carbonyl group. Furthermore, selenium dioxide alone oxidizes alcohols to aldehydes but stops cleanly there without forming carboxylic acids. It was most unexpected, therefore, to find that unsaturated aldehydes as a class can be successfully oxidized to unsaturated carboxylic acids by means of selenium or tellurium dioxide catalyst and oxidizing agents having oxidation potentials greater than that of the dioxide used, particularly peroxides having such oxidation potentials. For purposes of simplification, the invention will be described in more detail with reference to the use of selenium dioxide, the preferred catalyst, although by adjustment of conditions, tellurium dioxide can be used instead.

It is desirable, in order to supress by-product formation, to maintain in the reaction mixture at all times at least an equivalent amount of aldehyde to oxidizing agent, and preferably a stoichiometric excess of aldehyde groups to oxidizing agent. Where further oxidation of the initially formed unsaturated carboxylic acid is not undesirable, as, for example, in the conversion of unsaturated aldehydes to hydroxy-unsaturated carboxylic acids by oxidation of a chain carbon atom, generally a carbon atom alpha to a carbon atom to which the multiple carbon-to-carbon linkage is attached as well as the aldehyde group or groups present, it is, of course, feasible to employ in the reaction higher ratios of oxidizing agent to unsaturated aldehyde than are required for oxidizing aldehyde groups only. In the preferred modification of the invention, namely, oxidation of unsaturated aldehydes to the corresponding unsaturated carboxylic acids, about 0.5 to about 1 equivalent of peroxide is used, as a general rule, per equivalent of aldehyde in the unsaturated aldehyde being oxidized. Lower proportions are operative but there is usually no advantage to be gained from their use. Excess peroxide is preferably avoided in the preferred method of operation because it not only tends to cause undesirable side reactions, as previously indicated, but also is generally uneconomical since it is difficult to recover for reuse in the process after completion of the reaction. Either aqueous or anhydrous peroxide solutions can be used for the reaction, but with aqueous peroxide the yields are generally higher with the more concentrated solutions and it is preferred in the case of aqueous hydrogen peroxide, for example, to use solutions of at least 30%, more preferably at least 50%, by weight, concentration. Aqueous hydrogen peroxide of about 85%–93% concentration gives about the same results in the reaction as anhydrous peroxide.

The amount of selenium or tellurium dioxide or mixtures thereof used in the reaction can be varied widely although as a rule it is desirable to use at least 0.2%, and more preferably at least 2%, based upon the weight of unsaturated aldehyde present. Amounts greater than about 25% seem to give no advantage over smaller amounts and increase the problem of catalyst recovery. Temperatures within a range of about 20° C. to about 100° C. are suitable for the reaction which is usually substantially complete in three hours or less at the preferred temperature range of about 35° C. to 50° C. Either normal, superatmospheric or subatmospheric pressure can be used.

As previously indicated, it is preferable that the process be carried out in a liquid medium in the presence of an organic diluent which is a solvent for the unsaturated carboxylic acid produced and preferably also dissolves the unsaturated aldehyde which is being oxidized. Water, although it may be present in controlled limited amounts without interfering with the success of the process, does not serve as a suitable solvent-diluent in the process when monomeric unsaturated carboxylic acids are the desired product. While it is preferable that the chosen organic solvent-diluent be substantially inert under the reaction conditions, this is not always essential provided the reaction which the solvent-diluent undergoes is not undesirable. A number of different types of organic compounds have been found to be suitable as solvent-diluents in the new reaction. Alcohols, preferably alcohols of three to ten carbon atoms per molecule, are especially useful. The tertiary alcohols such as tertiary butyl and tertiary amyl alcohols, dimethyl propyl carbinol, methyl diethyl carbinol, 1-methylcyclohexanol, dimethyl phenyl carbinol, and the like have the advantage of being quite inert to esterification in the process as normally carried out to produce free unsaturated carboxylic acids. However, primary and secondary alcohols have been found to be also suitable in the process. Examples of such alcohols which have been found to be satisfactory are, for instance, methyl, ethyl, normal- and iso-propyl, normal-, iso- and secondary-butyl, and the corresponding amyl and hexyl alcohols, 2-ethyl hexanol, lauryl alcohol, cyclohexanol, 3-methylcyclohexanol, benzyl alcohol, furfuryl alcohol, and tetrahydrofurfuryl alcohol. Instead of monohydroxy alcohols, polyhydroxy alcohols may be used, suitable examples being butylene glycol, pentanediol-1,2, hexanediol-1,2,2-methylpentanediol-2,4, cyclohexanediol-1,2, catechol, etc. Substituted alcohols can likewise be used in the process. The polyalkylene, particularly polyethylene, glycols, preferably those containing two to eight alkylene glycol units per molecule, and the hydroxy ethers of polyhydric alcohols such, for example, as ethylene glycol mono-secondary butyl ether, propylene glycol mono-ethyl ether, diethylene glycol mono-isopropyl ether and glycerol dimethyl ether, are examples of solvent-diluents which are successful. Non-hydroxy ethers are also effective solvent-diluents in the new process. Typical examples are diethyl ether, methyl isobutyl ether, diamyl ether, dioxane, and the like.

Another type of solvent-diluent which has been found to be appropriate for use in oxidizing unsaturated aldehydes according to the invention is the carbonyl compounds which are resistant to oxidation, namely, ketones, carboxylic acids and carboxylic acid esters. Ketones such as acetone, methyl ethyl ketone, methyl isobutyl ketone, diacetone alcohol, cyclohexanone, acetophenone, benzophenone, etc., are especially useful. Acetic, butyric, lactic, benzoic, chloracetic and like acids, as well as their methyl, ethyl, normal- or isopropyl, butyl cyclohexyl and analogous esters can be similarly used.

Hydrocarbons, preferably aromatic hydrocarbons, or chlorhydrocarbons, of which benzene, toluene, xylene, cumene, tertiary butyl toluene, ethylene chloride, tetrachloroethane, chloroform, chlortoluene, etc. are typical, are other types of solvent-diluents which have been found to be suitable for use in the process. Such normally liquid aliphatic hydrocarbons as pentane, hexane, heptane, octane, isooctanes, for example hydrogenated butylene dimers, and the like are also suitable for use as solvent-diluents, as are normally gaseous hydrocarbons such as propane and the butanes when operating under sufficient pressure to keep them at least partly in the liquid state during the reaction. Unsaturated hydrocarbons can also be used successfully as solvent-diluents in the process. Typical examples of such solvent-diluents are, for instance, liquefied propylene or butylenes, amylenes, hexylenes, etc., liquid olefin polymers such as propylene trimers or tetramers, butylene dimers and trimers, etc. No oxidation of solvent-diluents of this type has been found to take place while unreacted aldehyde is present in the reaction mixture.

The reaction can be carried out batchwise, intermittently or continuously using any suitable procedure. For batchwise reaction, one suitable method is to dissolve the unsaturated aldehyde to be oxidized in one of the foregoing or other suitable organic liquid solvent-diluents or in a mixture of two or more such solvent-diluents and then add the required amount of selenium dioxide, preferably dissolved in the same solvent, to the solution. The chosen oxidizing agent, having an oxidation potential greater than that of selenium dioxide, is then added to the solution, most preferably in an amount about equal to, or slightly less than, the stoichiometric requirement for conversion of the unsaturated aldehyde to the desired unsaturated acid. The peroxide is advantageously added to the reaction mixture slowly with stirring and careful regulation of the temperature to maintain the mixture within the range of about 30° C. to about 60° C. After completion of the oxidation, as can be established by titration of samples from the reactor to determine when the formation of acid is complete, the unsaturated carboxylic acid produced can be recovered by distilling the reaction mixture or the mixture can be worked up in other suitable ways to obtain the desired final product. The process can be carried out continuously by introducing the oxidizing agent, preferably a peroxide, at spaced points along the path of flow of a solution of the starting unsaturated aldehyde and selenium dioxide in the chosen solvent-diluent as the solution is passed through a tubular reactor, reaction tower, or a plurality of reactors in series, or other suitable form of apparatus in which proper temperatures and flow rates are maintained as previously indicated. Still other reaction methods can be used for carrying out the reaction.

Where the unsaturated carboxylic acid produced is intended as an intermediate for further synthesis, it is often advantageous to use the solution of unsaturated acid in the chosen solvent-diluent for this purpose directly without isolating the acid from the mixture. Thus, when the unsaturated carboxylic acid is to be esterified with a saturated alcohol, such alcohol can be used as the solvent-diluent for the oxidation reaction and upon its completion a small amount of an esterification catalyst, such as sulfuric acid, para-toluene sulfonic acid or the like, can be added and the mixture heated to remove the water formed in the esterification. This method of operation has the special advantage that it facilitates recovery of the selenium dioxide catalyst used for the oxidation. A part of this catalyst is usually reduced in the course of the oxidation reaction and appears as a red precipitate of metallic selenium partly in colloidal form in the distillation residue after recovery of the unsaturated acid. This residue also contains unreduced selenium dioxide catalyst in solution along with any polymerized unsaturated acids formed as by-products in the reaction. These polymers are water-soluble, viscous compounds and add to the difficulty of recovering the selenium by filtration. It is nevertheless feasible to recover precipitated metallic selenium in this way, although filtration is usually slow and recovery is generally incomplete. When such a method is used, it is preferred to first treat the residue with a reducing agent, sodium bisulfite being suitable, to convert the remaining selenium dioxide to metallic selenium which is then filtered off with that precipitated in the reaction and reoxidized, for example, with peroxide, to selenium dioxide for reuse in the process. When the reaction mixture from the oxidation is subjected to an esterification treatment as above described, it is found that the precipitation of selenium is much more complete. There is no observable colloidal selenium such as otherwise interferes with complete recovery. Furthermore, the polymeric acids are esterified and made water-insoluble in the process so that on dilution, with water, of the residue remaining after distilling off the monomeric ester product, the polyesters can be readily separated from an aqueous phase containing the unreduced selenium dioxide in solution and from all the precipitated metallic selenium. Oxidation of the latter to selenium dioxide will then make all the catalyst available in a suitable form for reuse in the process.

Where esterification of the unsaturated carboxylic acid product is undesirable, one may first distill off the acid from the oxidation mixture and carry out esterification of the polymeric acid bottoms only by heating with an alcohol and an acid esterification catalyst. The recovery of the selenium and selenium dioxide then is carried out in the same way. Alternatively, one may employ heating with an acid in the absence of alcohol to effect complete precipitation of the reduced selenium and thus more efficient recovery by filtration. In such a method of operation it is feasible to return the unreduced selenium dioxide remaining in solution together with the water-soluble polymeric acid to the oxidation as a source of catalyst therefor. Still another, but less preferred, method of catalyst recovery is by means of acid exchange resins such, for example, as the commercial product sold as Amberlite I R–4B. It is also feasible to subject the distillation residue to burning and thus convert all the selenium to dioxide which is readily condensable from the combustion gases. This is most preferably avoided since it involves loss of the polymeric acids which, although produced in only a relatively small amount, are nevertheless useful by-products. Indeed, it may be desirable in some cases to carry out the reaction so as to promote formation of these polymeric acids which have many useful properties making them suitable for a variety of uses. Production of polymeric acids instead of monomeric unsaturated acids can be increased by increasing the water content of the reaction mixture, for example, large amounts being formed when water is used as the sole solvent-diluent.

Any suitable oxidizing agent having an oxidation potential greater than that of selenium dioxide can be used successfully in the new method. Preferably, a suitable peroxide, most preferably hydrogen peroxide, is employed but other inorganic peroxides or organic peroxides are effective, and suitable chlorates, chlorites, hypochlorites, etc. can also be used. Sodium and barium peroxides and the like are examples of other inorganic peroxides which can be employed, while typical organic peroxides are, for instance, tertiary butyl hydroperoxide, benzoyl peroxide, per acids such as peracetic, performic and perphthalic acids, and the like. Mixed peroxides obtainable by partial oxidation of hydrocarbons, for example, as described in U. S. Patent 2,376,257, are another example of the peroxides which can be used as the oxidizing agent.

The process is applicable to the oxidation of a wide variety of unsaturated, preferably olefinic, aldehydes which may be aliphatic, alicyclic or aromatic substituted aldehydes. The aldehydes may be substituted by hydroxy, ether, carboxylic acid, carboxylic acid ester, keto, nitro and like groups or halogen atoms. Acrolein, alpha-chloracrolein, crotonaldehyde, methacrolein, tiglic aldehyde, alpha-ethylacrolein, beta-methyl crotonaldehyde, alpha,beta-dimethyl crotonaldehyde, alpha,gamma-dimethyl crotonaldehyde, beta-ethyl crotonaldehyde, 2-hexenal, alpha - isobutylacrolien, alpha - amylacrolein, citral, alpha- or beta-cyclohexylacrolein, 1-cyclohexene-2-carboxaldehyde, beta-phenethylacrolein, tetrolaldehyde, cinnamaldehyde and the like are representative of the alpha,beta-olefinic aldehydes to which the new process can be applied with special advantage because this type of unsaturated aldehyde gives particularly great difficulty in oxidation to unsaturated acids by prior methods. The new process is equally successful, however, in producing unsaturated carboxylic acids from aldehydes having an olefinic double bond or an acetylenic linkage further removed from the aldehyde group. Typical examples of such aldehydes which have been so used are vinyl acetaldehyde, 3-pentenal, 4-pentenal, metyhl vinyl acetaldehyde, isopropenyl acetaldehyde, citronellal, rhodinal, and 2-phenyl-4-hexenal. Representative acetylenic aldehydes which can be successfully oxidized to the corresponding acetylenic acids by the process of the invention include, for instance, propargyl aldehyde, amyl propargyl aldehyde. Fumaric acid can be produced from either beta-formylacrylic acid or from fumaric dialdehyde and glutaconic acid from glutaconic dialdehyde by the new method of the invention. Instead of individual unsaturated aldehydes, mixtures of two or more such aldehydes can be oxidized to unsaturated acids in the same way. The unsaturated aldehyde or unsaturated aldehyde mixture need not be pure, but can contain other compounds including saturated aldehydes which may undergo simultaneous oxidation, or inert compounds which will not interfere with the reaction.

Whatever combination of unsaturated aldehyde and oxidizing agent is chosen for the reaction, when unsaturated monomeric carboxylic acids are the desired product, it is important, as previously indicated, that the water content of the feed materials be regulated so that the amount of water in the reacted mixture, including that produced in the reaction, does not exceed about 30%, and is more preferably not greater than 10%. The highest yields are achieved when such water content is in the range of about 6% to 4% by weight of the reacted mixture.

The following examples, in which the conversions and yields are expressed as mole per cent of the theoretical, illustrate in more detail suitable methods of carrying out the new process and show some of its advantages.

Example I

Acrolein (1 gram mole) dissolved in 350 grams of tertiary butyl alcohol, together with 1 gram of selenium dioxide as catalyst, was treated with 1 mole of hydrogen peroxide added as an aqueous solution of 90% hydrogen peroxide concentration. After 32 hours at 25° C.–50° C., titration showed the production of 0.83 equivalent of acid. On distillation there was obtained a 67% conversion of hydrogen peroxide to distilled acrylic acid as confirmed by neutralization equivalent, polymerization to a partly water-soluble polymer, and melting point and mixed melting point of the beta-anilinopropionic acid anilide prepared by heating the acid for 5 hours at 180° C.–190° C. with aniline according to the procedure of Autenrieth and Pretyell, Ber. 36, 1264 (1903). The melting point of the anilide was 91° C.–92° C. and the melting point of the anilide from authentic acrylic acid was 93° C.–93.5° C. The mixed melting point was also 93° C.–93.5° C., confirming the identify of the acrolein oxidation product as acrylic acid. Analysis of the anilide was as follows:

| | Found | Calculated for ⟨⟩NHCH₂CH₂CONH⟨⟩ |
|---|---|---|
| C | 74.9 | 74.97 |
| H | 6.8 | 6.71 |
| N | 11.7 | 11.66 |

The difference between the titrated acid and the recovered acrylic acid was due chiefly to polymerization of the acrylic acid during recovery which can be eliminated by avoiding local heating during distillation and bubbling gaseous oxygen through the distillation mixture, the oxygen acting as an effective polymerization inhibitor. Copper is also effective in suppressing polymerization during recovery of the product.

When the run was repeated using water as the solvent-diluent in place of the tertiary butyl alcohol, no distillable acrylic acid was obtained, the products being high boiling polyacrylic acids.

Example II

Methacrolein was oxidized by the procedure of Example I using 1.5 moles of methacrolein per mole of hydrogen peroxide of 90% initial concentration. The methacrolein was used as a 23% solution in tertiary butyl alcohol containing 4.76% of selenium dioxide and 0.95% of trinitrobenzene as a polymerization inhibitor based upon the weight of methacrolein present. In two hours' reaction time a 93.7% conversion of hydrogen peroxide to overheaded methacrylic acid was obtained by careful distillation in which local overheating was avoided. The methacrylic acid was identified by reaction with aniline to give beta-anilinoisobutyroanilide. Melting point and mixed melting point with an authentic sample was 119° C.–120° C. The anilide analyzed as follows:

| | Found | Calculated for |
|---|---|---|
| | | 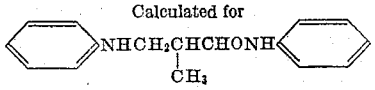 |
| C | 75.6 | 75.62 |
| H | 7.6 | 7.13 |
| N | 10.9 | 11.01 |

* An attempt to replace the hydrogen peroxide with gaseous oxygen in this reaction gave negative results.

When 35% aqueous hydrogen peroxide was used instead of the 90% peroxide, with a methacrolein solution in tertiary butyl alcohol of 13% concentration but otherwise similar reaction conditions, although the reaction was slower, a conversion to overheaded methacrylic acid of 86% was obtained.

Example III

A series of tests were made to determine the effect of reaction variables in the oxidation of acrolein to acrylic acid using 1.5 moles of acrolein per mole of hydrogen peroxide, tertiary butyl alcohol as the solvent-diluent, and about 9% of selenium dioxide catalyst based upon the weight of acrolein. The results obtained under various reaction conditions were as follows:

| Concentration of $H_2O_2$ Used, Percent | Reaction Temp., °C. | Concentration of Acrolein in Tertiary Butyl Alcohol, Percent | Conversion of $H_2O_2$ to Distilled Acrylic Acid, Percent | Yield of Acrylic Acid on Acrolein Consumed, Percent |
|---|---|---|---|---|
| 90 | 60 | 23 | 74–75 | 83 |
| 90 | 40 | 23 | 89 | |
| 90 | 40 | 13 | 87 | 86 |
| 35 | 40 | 13 | 73 | 76 |

Example IV

Using a 1:1 mole ratio of acrolein to hydrogen peroxide, 9% of selenium dioxide catalyst based upon the weight of acrolein and 23% by weight of acrolein in tertiary butyl alcohol as the solvent-diluent, the following results were obtained at 40° C. and reaction times of 2½ to 3 hours with different initial concentrations of hydrogen peroxide:

| Concentration of $H_2O_2$ Used, Percent | Concentration of Acrolein in Tertiary Butyl Alcohol, Percent | Conversion of $H_2O_2$ to Distilled Acrylic Acid, Percent |
|---|---|---|
| 90 | 23 | 92.7 |
| 34.8 | 23 | 80.1 |
| 34.8 | 13 | [1] 84.5–85.3 |

[1] 18% selenium dioxide used.

By reducing the reaction temperature when carrying out the oxidation in the same way with 34.8% hydrogen peroxide, a conversion to distilled acrylic acid of 83.6% was obtained.

Example V

With tertiary amyl alcohol as the solvent-diluent, a 1:1 mole ratio of acrolein to hydrogen peroxide, 23% by weight of acrolein in the alcohol, 9% of selenium dioxide based upon the weight of acrolein, and a reaction temperature of 40° C., the following results were obtained with 34.8% hydrogen peroxide and anhydrous hydrogen peroxide, respectively:

| Concentration of $H_2O_2$ with Respect to Water, Percent | Conversion of $H_2O_2$ to Distilled Acrylic Acid, Percent |
|---|---|
| 34.8 | 79.5 |
| 100. | 90.0 |

Similar good results have been obtained under analogous conditions with the following representative solvent-diluents which are listed in their order of decreasing preference: dioxane, acetone, isopropyl alcohol, benzene, methanol and acetic acid. Using a mixture of 71.5% tertiary butyl alcohol and 28.5% of benzene with 34.8% hydrogen peroxide as the oxidizing agent gave 80.1% conversion of acrolein to acrylic acid at a yield of 86.5% based on the acrolein consumed under the foregoing conditions.

Example VI

In the oxidation of alpha-chloracrolein, slow addition of 90% hydrogen peroxide to a solution of about 21% by weight of alpha-chloracrolein in tertiary butyl alcohol, containing about 2% of selenium dioxide, over a period of about 2 hours until about one mole of peroxide had been added for each 1.5 moles of aldehyde present, gives a conversion of hydrogen peroxide to alpha-chloracrylic acid of about 90% and a yield of alpha-chloracrylic acid of about 91% based on the alpha-chloracrolein consumed when using a reaction temperature of about 40° C.

Under similar conditions good yields of dibromomaleic acid are obtained in the reaction of dibromomaleic dialdehyde and of alpha-chloroglutaconic acid when oxidizing alpha-chloroglutaconic dialdehyde.

Equally good results are obtained in the oxidation of crotonaldehyde to crotonic acid, tiglic aldehyde to tiglic acid, oleyl aldehyde to oleic acid, propargyl aldehyde to propargylic acid and cinnamyl aldehyde to cinnamic acid, for further examples.

Example VII

Butyl acrylate was produced by oxidizing a solution of acrolein in n-butanol of about 14% concentration containing about 1.2% of selenium dioxide catalyst using one mole of hydrogen peroxide, added as a 90% aqueous solution, per mole of acrolein and a reaction temperature of 40° C. After addition of about 0.23% of para-toluene sulfonic acid to the reacted mixture as esterification catalyst, the mixture was distilled to remove water azeotropically and then vacuum distilled at 20 mm. Hg pressure. The conversion to n-butyl acrylate was 68% based on the acrolein and hydrogen peroxide used.

Under similar conditions, using ethanol, secondary butanol and allyl alcohol as solvents, good yields of ethyl acrylate, secondary butyl acrylate and allyl acrylate, respectively, were obtained.

Example VIII

Tetrahydrobenzaldehyde (produced as the adduct of butadiene and acrolein) oxidizes to the corresponding tetrahydrobenzoic acid on treatment with an equal molecular amount of hydrogen peroxide added as a 90% aqueous solution. In about 3 hours' reaction at about 50° C. conversions to tetrahydrobenzoic acid of the order of 80%–85% are obtained.

The tetrahydrobenzaldehyde used in this illustration is exemplary of a subgroup of cyclo-olefinic aldehydes which offer special difficulty in oxidation by prior methods but which have been found to be particularly useful, as a class, as starting materials for the production of olefinic acids by the process of the invention. These aldehydes are produced as Diels-Alder adducts of dienes with olefinic aldehydes. Other members of this class of aldehydes which can be successfully oxidized in the same way to the corresponding olefinic acids are the methyl tetrahydrobenzaldehydes produced as adducts of acrolein with pentadiene, isoprene and dimethyl pentadiene, 1-methyl-3-cyclohexenecarboxaldehyde and 6-methyl-3-cyclohexenecarboxaldehyde from butadiene with methacrolein and crotonaldehyde, 2,5-endomethylenetetrahydrobenzaldehyde from acrolein and cyclopentadiene, for example.

The same oxidations can be carried out using tellurium dioxide in place of the selenium dioxide.

It will thus be seen that the invention is capable of wide variation not only in regard to the type of unsaturated aldehyde which may be thus converted to an unsaturated carboxylic acid but also in regard to the peroxides which can be used as oxidizing agents and the method of operation and reaction conditions which can be successfully used. Thus, it has been found feasible to use selenium or tellurium dioxide deposited on a carrier, for instance, silica gel, as the catalyst in the process. Instead of adding the selenium or tellurium dioxide as such, they may be introduced in oxidized form, for instance, with the oxidizing agent or after oxidation therewith, or in the form of other compounds which liberate or otherwise generate the catalytic form of these dioxides under the reaction conditions. It may be that an oxidized form or forms of the selenium and/or tellurium dioxides is the effective catalytic agent in the process, and reference to these dioxides in the following claims is intended to include all forms thereof which are effective in catalyzing the reaction. Still other changes can be made in the new process without departing from the invention, which, it will be understood, is not limited by any theory proposed in explanation of the improved results which are obtained.

We claim as our invention:

1. A process of producing an unsaturated carboxylic acid which comprises reacting an unsaturated aldehyde in the presence of a member of the group consisting of selenium and tellurium dioxides with a per oxidizing agent of the group consisting of hydrogen peroxide, sodium peroxide, barium peroxide, tertiary butyl hydroperoxide, benzoyl peroxide, and peracetic, performic and perphathalic acids.

2. A process in accordance with claim 1 in which the reaction is carried out with tellurium dioxide catalyst and a solution of the unsaturated aldehyde in a solvent substantially stable to oxidation under the reaction conditions.

3. A process of producing an unsaturated carboxylic acid which comprises reacting an unsaturated aldehyde in the presence of a member of the group consisting of selenium and tellurium dioxides with hydrogen peroxide.

4. A process of producing an unsaturated carboxylic acid which comprises reacting an unsaturated aldehyde in an organic solvent with hydrogen peroxide in the presence of at least 0.2% of selenium dioxide based upon the weight of unsaturated aldehyde present.

5. A process in accordance with claim 4 wherein the reaction is carried out at a temperature of about 20° C. to about 100° C.

6. A process in accordance with claim 5 wherein the water content of the reaction mixture is maintained below about 30% by weight throughout the reaction.

7. A process of oxidizing an alpha,beta-olefinic aldehyde to the corresponding unsaturated carboxylic acid which comprises reacting a solution of said aldehyde in an organic solvent substantially stable to oxidation under the reaction conditions, with hydrogen peroxide in the presence of at least 0.2% of selenium dioxide based upon the weight of unsaturated aldehyde present.

8. A process in accordance with claim 7 wherein the reaction is carried out at a temperature of about 20° C. to about 100° C. with alcohol solution of the olefinic aldehyde.

9. A process in accordance with claim 8 wherein an esterification catalyst is added to the reacted mixture and the mixture is heated to effect esterification of the carboxylic acid produced by said school.

10. A process in accordance with claim 8 wherein the alcohol is a tertiary aliphatic alcohol and the water content of the reaction mixture is maintained below about 30% by weight throughout the reaction.

11. A process of oxidizing an aliphatic alpha,beta-monoolefinic aldehyde having a terminal methylene group to the corresponding unsaturated carboxylic acid which comprises reacting a solution of said aldehyde in an organic solvent which is substantially stable to oxidation under the reaction conditions with not more than the stoichiometric amount of a per oxidizing agent of the group consisting of hydrogen peroxide, sodium peroxide, barium peroxide, tertiary butyl hydroperoxide, benzoyl peroxide, and peracetic, performic and perphthalic acids in the presence of about 2% to 25% of selenium dioxide based upon the weight of said aldehyde present while maintaining the water content of the reaction mixture below about 30% by weight throughout the reaction.

12. A process in accordance with claim 11 wherein the reaction is carried out at a temperature of about 20° C. to about 100° C. with an alcohol solution of the olefinic aldehyde of not more than 35% concentration.

13. A process in accordance with claim 11 wherein the reaction is carried out in solution in a saturated aliphatic tertiary alcohol of 4 to 6 carbon atoms using hydrogen peroxide in a mole ratio to unsaturated aldehyde within the range of 0.66:1 to 1.0:1.

14. A process of producing acrylic acid which comprises reacting acrolein with hydrogen peroxide in the presence of selenium dioxide and a liquid organic solvent for acrylic acid.

15. A process in accordance with claim 14 wherein the reaction is carried out at about 25° C. to about 80° C. using a solution of acrolein of not more than 35% concentration and maintaining the water content of the reaction mixture below about 30% by weight.

16. A process of producing methacrylic acid which comprises reacting methacrylein with hydrogen peroxide in the presence of at least 0.2% of selenium dioxide based on the weight of methacrolein present and of a liquid organic solvent for methacrylic acid which is substantially stable to oxidation under the reaction conditions.

17. A process in accordance with claim 16 wherein the reaction is carried out at about 25° C. to about 80° C. using a solution of methacrolein of not more than 35% concentration and maintaining the water content of the reaction mixture below about 30% by weight.

18. A process of producing crotonic acid which comprises reacting crotonaldehyde with hydrogen peroxide at about 25° C. to about 80° C. using a solution of crotonaldehyde in a liquid organic solvent which is substantially stable to oxidation under the reaction conditions and about 2% to 25% by weight of selenium dioxide based upon the crotonaldehyde employed.

19. A process of producing a chloracrylic acid which comprises reacting chloracrolein with a per oxidizing agent of the group consisting of hydrogen peroxide, sodium peroxide, barium peroxide, tertiary butyl hydroperoxide, benzoyl peroxide, and peracetic, performic and perphalic acids in the presence of selenium dioxide.

(References on following page)

References Cited in the file of this patent

UNITED STATES PATENTS

| | | |
|---|---|---|
| 2,153,406 | Bauer | Apr. 4, 1939 |
| 2,183,325 | Staudinger | Dec. 12, 1939 |
| 2,386,365 | Staudinger et al. | Oct. 9, 1945 |
| 2,397,891 | Tuerck | Apr. 2, 1946 |
| 2,413,235 | Kennedy | Dec. 24, 1946 |

FOREIGN PATENTS

| | | |
|---|---|---|
| 560,166 | Great Britain | Mar. 23, 1944 |

OTHER REFERENCES

Seguin: Compt. rend. (Fr. Acad.) vol. 216, pgs. 667-8 (1943).